United States Patent [19]
Raith

[11] Patent Number: 5,970,057
[45] Date of Patent: *Oct. 19, 1999

[54] METHOD AND APPARATUS FOR DISTINGUISHING BETWEEN A DIGITAL CONTROL CHANNEL AND A DIGITAL TRAFFIC CHANNEL IN A RADIOCOMMUNICATION SYSTEM

[75] Inventor: Alex Krister Raith, Durham, N.C.

[73] Assignee: Telefonaktiebolaget LM Ericsson, Stockholm, Sweden

[*] Notice: This patent is subject to a terminal disclaimer.

[21] Appl. No.: 08/481,865

[22] Filed: Jun. 7, 1995

Related U.S. Application Data

[60] Division of application No. 08/331,711, Oct. 31, 1994, which is a continuation-in-part of application No. 08/147,254, Nov. 1, 1993, Pat. No. 5,603,081.

[51] Int. Cl.⁶ .................................... H04Q 7/00
[52] U.S. Cl. ......................... 370/324; 455/434; 455/513
[58] Field of Search ................. 370/95.1, 95.3, 370/321, 328, 329, 333, 331, 337, 341, 347, 442; 455/34.1, 62, 161.1, 161.3, 166.2, 70, 436–439, 442, 434, 512, 513, 517, 450; 379/59, 63, 60, 58, 61; 375/341, 224

[56] References Cited

U.S. PATENT DOCUMENTS

| | | |
|---|---|---|
| 4,527,284 | 7/1985 | Röttger . |
| 4,551,852 | 11/1985 | Grauel et al. . |
| 4,633,509 | 12/1986 | Scheinert . |
| 4,850,033 | 7/1989 | Eizenhöfer et al. ................ 455/56 |
| 4,876,738 | 10/1989 | Selby ................................ 455/33 |
| 5,093,926 | 3/1992 | Sasuta ............................... 455/34 |
| 5,119,397 | 6/1992 | Dahlin et al. . |
| 5,129,097 | 7/1992 | Suzuki et al. . |
| 5,182,753 | 1/1993 | Dahlin et al. .................... 455/33.2 |
| 5,200,957 | 4/1993 | Dahlin ........................... 370/100.1 |
| 5,257,401 | 10/1993 | Dahlin et al. .................... 455/33.2 |
| 5,353,332 | 10/1994 | Raith et al. ....................... 379/59 |
| 5,377,193 | 12/1994 | Grube et al. .................... 370/95.1 |
| 5,418,839 | 5/1995 | Knuth et al. ...................... 379/61 |

FOREIGN PATENT DOCUMENTS

| | | |
|---|---|---|
| 2060428 | 8/1992 | Canada . |
| 111 972 | 6/1984 | European Pat. Off. . |
| 167 331 | 1/1986 | European Pat. Off. . |
| 240 073 | 10/1987 | European Pat. Off. . |
| 42 11 815 | 10/1993 | Germany . |
| 06-284075 | 10/1994 | Japan . |
| 2259633 | 3/1993 | United Kingdom . |

OTHER PUBLICATIONS

PCT International Search Report regarding PCT/US94/12648 Date of mailing: Mar. 13, 1994.

"A New Standard for North American Digital Cellular", Magnus Isaksson et al., *Ericsson Review*, No. 2, pp. 58–69 (1994).

"Cellular System Dual–Mode Mobile Station—Base Station Compatibility Standard", *EIA/TIA Interim Standard*, IS–54–B, pp. 101–106; 109–116; 139–140; and 163–166 (Apr., 1992).

(List continued on next page.)

*Primary Examiner*—Ajit Patel
*Attorney, Agent, or Firm*—Burns, Doane, Swecker & Mathis, L.L.P.

[57] ABSTRACT

A method and system for locating control channels, particularly digital control channels, are described. By grouping the channels which are candidates for carrying supervisory messages in blocks indicative of their relative likelihood for being used as control channels, a mobile station can begin its search for a control channel with channels which are most likely to actually be control channels. Placing location information on other channels allows the mobile station to be redirected to a control channel when it reads one of these other channels. Similarly, by placing information describing the location of a control channel in a message associated with handoff, a mobile station avoids the necessity of having to relocate a new control channel associated with the base station to which the mobile has been handed off.

10 Claims, 8 Drawing Sheets

OTHER PUBLICATIONS

"Mobile Station–Base Station Standard for Dual–Mode Wideband Spread Spectrum Cellular System", *TIA/EIA Interim Standard*, TIA/EIA/IS–95, pp. 2–13, 2–31, 6–7 thru 6–12, 6–66 thru 6–69, 7–1 thru 7–6 (Jul., 1993). [Copy enclosed.].

European Standard Search Report No. RS 95379, Date of completion: Oct. 23, 1995.

B. –M. Fingerle, "*GSM Signalisierung in der Praxis*", ITG Fachbericht 124, Mobile Kommunikation, pp. 423–432 (Sep. 27–29, 1993).

European Standard Search Report No. RS 95770, Date of completion: Oct. 23, 1995.

European Standard Search Report No. RS 95769, Date of completion: Oct. 23, 1995.

| Channel Numbers | Relative Probability |
|---|---|
| 1-26 | 1 |
| 27-52 | 2 |
| 53-78 | 3 |
| 79-104 | 4 |
| 105-130 | 5 |
| 131-156 | 6 |
| 157-182 | 7 |
| 183-208 | 8 |
| 209-234 | 9 |
| 235-260 | 10 |
| 261-286 | 11 |
| 287-312 | 12 |
| 313-333 | 16 |
| 667-691 | 13 |
| 692-716 | 14 |
| 991-1023 | 15 |

FIG. 1A

| Channel Numbers | Relative Probability |
|---|---|
| 334-354 | 16 |
| 355-380 | 1 |
| 381-406 | 2 |
| 407-432 | 3 |
| 433-458 | 4 |
| 459-484 | 5 |
| 485-510 | 6 |
| 511-536 | 7 |
| 537-562 | 8 |
| 563-588 | 9 |
| 589-614 | 10 |
| 615-640 | 11 |
| 641-666 | 12 |
| 717-741 | 13 |
| 742-766 | 14 |
| 767-799 | 15 |

FIG. 1B

| Block Number | Channel Number | Band | Number of Channels | Relative Probability |
|---|---|---|---|---|
| 1 | 1-26 | A | 26 | 4 |
| 2 | 27-52 | A | 26 | 5 |
| 3 | 53-78 | A | 26 | 6 |
| 4 | 79-104 | A | 26 | 7 |
| 5 | 105-130 | A | 26 | 8 |
| 6 | 131-156 | A | 26 | 9 |
| 7 | 157-182 | A | 26 | 10 |
| 8 | 183-208 | A | 26 | 11 |
| 9 | 209-234 | A | 26 | 12 |
| 10 | 235-260 | A | 26 | 13 |
| 11 | 261-286 | A | 26 | 14 |
| 12 | 287-312 | A | 26 | 15 |
| 13 | 313-333 | A | 21 | 16 (Lowest) |
|  |  |  |  |  |
| 14 | 667-691 | A' | 25 | 3 |
| 15 | 692-716 | A' | 25 | 2 |
|  |  |  |  |  |
| 16 | 991-1023 | A" | 33 | 1 (Highest) |

FIG. 1C

| Block Number | Channel Number | Band | Number of Channels | Relative Probability |
|---|---|---|---|---|
| 1 | 334-354 | B | 21 | 16 (Lowest) |
| 2 | 355-380 | B | 26 | 15 |
| 3 | 381-406 | B | 26 | 14 |
| 4 | 407-432 | B | 26 | 13 |
| 5 | 433-458 | B | 26 | 12 |
| 6 | 459-484 | B | 26 | 11 |
| 7 | 485-510 | B | 26 | 10 |
| 8 | 511-536 | B | 26 | 9 |
| 9 | 537-562 | B | 26 | 8 |
| 10 | 563-588 | B | 26 | 7 |
| 11 | 589-614 | B | 26 | 6 |
| 12 | 615-640 | B | 26 | 5 |
| 13 | 641-666 | B | 26 | 4 |
| | | | | |
| 14 | 717-741 | B' | 25 | 3 |
| 15 | 742-766 | B' | 25 | 2 |
| 16 | 767-799 | B' | 33 | 1 (Highest) |

FIG. 1D

| Information Element | Type | Length (bits) |
|---|---|---|
| Protocol Discriminator | M | 2 |
| Message Type | M | 8 |
| Ack Message Type | M | 8 |
| Remaining Length | M | 6 |
| Last Decoded Parameter | O | 14 |
| DCC Information | O | 29 |

FIG. 4A

| Field | Length (bits) |
|---|---|
| Parameter Type (DCC Information) | 4 |
| Number of Values | 6 |
| Channels | 11 |
| DVCC | 8 |

FIG. 4B

METHOD AND APPARATUS FOR DISTINGUISHING BETWEEN A DIGITAL CONTROL CHANNEL AND A DIGITAL TRAFFIC CHANNEL IN A RADIOCOMMUNICATION SYSTEM

RELATED APPLICATION

This application is a divisional of application Ser. No. 08/331,711, filed Oct. 31, 1994 which is a continuation-in-part of U.S. patent application Ser. No. 08/147,254 entitled "A Method for Communicating in a Wireless Communication System", filed on Nov. 1, 1993 now U.S. Pat. No. 5,603,081, which disclosure is incorporated here by reference.

BACKGROUND

The present invention relates generally to radiocommunication systems having control channels and, more particularly, to the location of digital control channels in such systems.

Radiocommunication systems have traditionally been analog in nature. The rapid growth of radiocommunication systems, however, has compelled system designers to search for ways in which system capacity can be increased without reducing communication quality beyond consumer tolerance thresholds. One way in which increased capacity can be provided is by changing from analog to digital communication techniques. In North America, this change was implemented by transitioning from the analog AMPS system to a digital system (D-AMPS) which is now standardized as IS-54B.

Since a large consumer base having equipment that operated only in the analog domain existed prior to the introduction of digital techniques, a dual-mode (analog and digital) standard was adopted in IS-54B so that analog compatibility was provided in tandem with digital communication capability. For example, the IS-54B standard provides for both analog and digital traffic channels, wherein the system operator can replace analog traffic channels with digital traffic channels, and vice-versa, in a dynamic manner to accommodate fluctuating traffic patterns among analog and digital users.

In addition to traffic channels, radiocommunication systems also provide control channels which are used to carry call setup data messages between base stations and mobile stations. According to IS-54B, for example, there are 21 dedicated analog control channels which are assigned to fixed frequencies for each of the A and B carriers. These analog control channels are termed "dedicated" since they are always found at the same frequency and, therefore, can be readily located by the mobile stations which need to monitor the data which is transmitted thereon.

For example, when in the idle state (i.e., turned on but not in use), a mobile station in an IS-54B system tunes to and then continuously monitors the strongest control channel at its known frequency (generally, the control channel of the cell in which the mobile station is located at that moment) and may receive or initiate a telephone call through the corresponding base station. When moving between cells while in the idle state, the mobile station will eventually "lose" radio connection on the control channel of the "old" cell and tune to the control channel of the "new" cell. The initial tuning to, and the change of, control channel are both accomplished automatically by scanning all the control channels at their known frequencies in operation in the cellular system to find the "best" control channel. When a control channel with good reception quality is found, the mobile station remains tuned to this channel until the quality deteriorates again. In this manner, all mobile stations are nearly always "in touch" with the system.

As such hybrid systems mature, it is anticipated that the number of analog users will diminish and the number of digital users will increase. Eventually all of the analog traffic channels will probably be replaced by digital traffic channels. When that occurs, less expensive digital-only mobile units can replace the current dual-mode units. However, such digital-only mobile units would be unable to scan the analog control channels currently provided in the IS-54B system.

Accordingly, it is desirable to provide digital control channels to radiocommunication systems which support digital technology, such as that described by IS-54B. In addition to compatibility issues, digital control channels are also desirable for other reasons described in the above-identified application, for example an enhanced sleep mode for mobile units which results in longer battery life. Whereas IS-54B provides dedicated control channels, more flexibility is desirable in assigning the number of control channels and the frequencies for these control channels to optimize system capacity and to support hierarchical cell structures, i.e., microcells, picocells, etc. If, however, the digital control channels are not located on known frequencies, the question arises as to how the remote units will be able to locate these control channels for monitoring.

One conventional radiocommunication system used in Europe, known as the GSM, is already an all-digital system. In this system, the mobile unit simply scans through all of the available channels until it identifies a digital control channel. This location technique, however, is too slow for systems having a large number of channels. Moreover, the problem of locating a digital control channel after call termination is exacerbated by handoffs of mobile units that move from cell to cell, since a mobile unit cannot then even use its knowledge of the location of the control channel which it had been monitoring prior to the call.

SUMMARY

These and other drawbacks and limitations of conventional systems and methods are overcome according to the present invention wherein digital control channel location is expedited by, for example, prescribing a search pattern based on a relative likelihood of finding a digital control channel on a particular channel or group of channels and providing digital control channel location information on other channels.

According to exemplary embodiments of the present invention, channels are grouped into probability blocks which are ranked in accordance with the relative likelihood of finding the digital control channel in each block. A mobile unit can then look for a digital control channel within a highest ranked probability block, followed by a second highest ranked probability block and so on, until a digital control channel is located.

According to other exemplary embodiments of the present invention, information can be provided on other channels, such as traffic channels or analog control channels, which points the mobile station to a particular channel on which a digital control channel can be found or a group of channels within which a digital control channel can be found. In this way, the location process is expedited when compared with sequential channel searching.

According to still further exemplary embodiments of the present invention, a mobile unit can receive information about digital control channel location during call termination. In this way, the mobile unit need not repeat the process of trying to determine where a digital control channel is located immediately after call termination, which is particularly useful in situations where the mobile moved to a new cell during the call.

BRIEF DESCRIPTION OF THE DRAWINGS

The foregoing, and other, objects, features and advantages of the present invention will be more readily understood upon reading the following detailed description in conjunction with the drawings in which:

FIGS. 1(a)–1(d) are tables which show exemplary probability block schemes according to the present invention;

FIG. 4(a) is a table which illustrates an exemplary message format according to the present invention;

FIG. 4(b) is a table which illustrates an entry of the table of FIG. 4(a) in more detail.

DETAILED DESCRIPTION

According to exemplary embodiments of the present invention, several techniques can be used, either together or individually, to expedite the acquisition of a digital control channel by the mobile station.

One technique which can be used to aid the mobile in searching for a digital control channel is to group the available frequencies into blocks which are assigned different probabilities that reflect the relative likelihood of finding a digital control channel in each block. In this manner, the time required for service acquisition by the mobile station may be significantly decreased. The two tables depicted in FIG. 1(a) and 1(b) are examples of how the channels in the A-Band and B-Band, respectively, can be assigned different relative probabilities for supporting digital control channel acquisition. Similarly, FIG. 1(c) and 1(d) present another such example. This technique can be used by a mobile station as a starting point for digital control channel location, for example, before it has received any digital control channel locator information (described below). Once a mobile station has received digital control channel locator information, it can use this information in lieu of the channel block probability scheme described herein.

Another technique for aiding the mobile in its search for a digital control channel is to place digital control channel location information on channels other than the digital control channel so that if the mobile reads such a channel while searching for the DCC, its search can be expedited. For example, the digital control channel locator (DL) is a parameter which can be placed on the digital traffic channel and that provides information to assist a mobile station in finding a digital control channel. The DL identifies for the mobile station the RF channel which carries a digital control channel. Depending upon the number of bits available to express the DL and the number of channels in the system, the DL may uniquely identify the channel on which a digital control channel resides or it may narrow the search to some subset of the possible channels. For example, if a 7-bit DL is provided, then DL values 1, 2, 3. . . 127 would be mapped to channel numbers 1–8, 9–16, 17–24,. . .1009–1016, respectively. Thus, for example, if a digital control channel occupies channel number 10, then a DL value of 2 would be sent on the digital traffic channels in the same cell. The DL value of zero does not provide any digital control channel location information, but instead indicates that no DL information is being provided by the system.

Figure 2A:
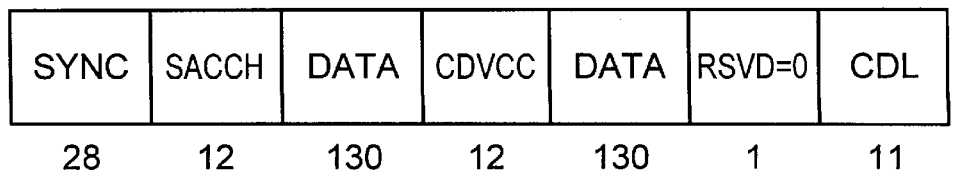
FIG. 2(a) illustrates an exemplary downlink digital traffic channel according to the present invention.
Figure 2B:
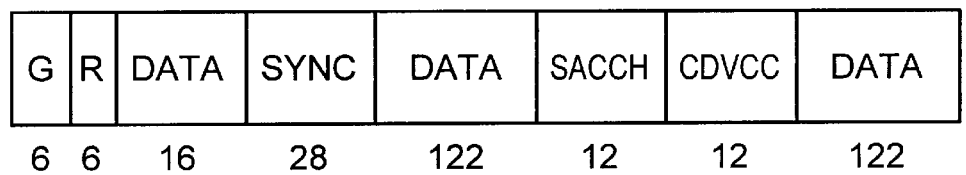
FIG. 2(b) illustrates a conventional uplink digital traffic channel.
Figure 2C:
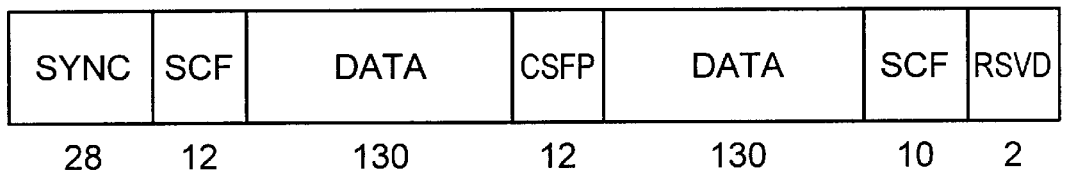
FIG. 2(c) illustrates an exemplary uplink digital control channel slot format according to the present invention.
Figure 2D:
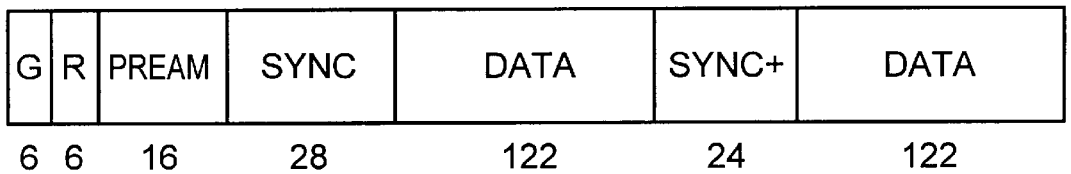
FIG. 2(d) illustrates an exemplary downlink digital control channel slot format according to the present invention.
Figure 2E:
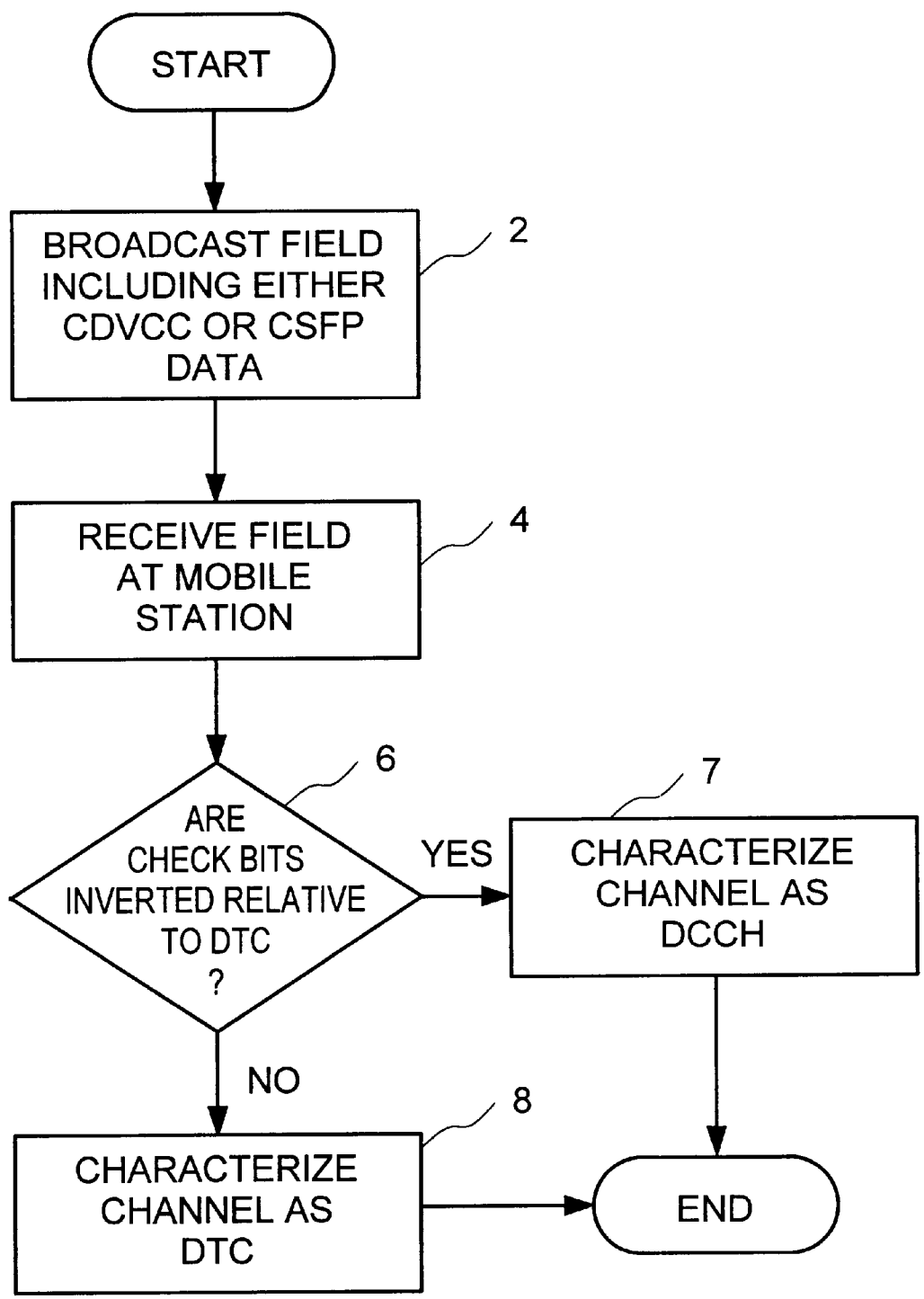
FIG. 2(e) is a flow chart illustrating an exemplary technique for distinguishing between traffic channels and control channels.

Once DL values are determined, they are encoded to form the CDL which is sent on the digital traffic channel in, for example, bit positions 314 to 324 in a IDMA slot. This is illustrated by the exemplary digital traffic channel base-to-mobile slot format shown in FIG. 2(a). The numbers below the data fields indicate the number of bits therein. Fields other than the CDL are those found in conventional IS-54B base-to-mobile traffic channel slots and the interested reader is referred thereto for additional information. Exemplary uplink digital traffic channel, uplink digital control channel, and downlink digital control channel slot formats are illustrated as FIGS. 2(b), 2(c) and 2(d), respectively, for reference and later discussion. Those skilled in the art will appreciate that other bit positions can be used for the CDL field in the slot, however, this particular position is advantageous in that it corresponds to the previously unused RSVD field of the downlink digital traffic channel slots of IS-54B. In this way, changes to the IS-54B air interface are minimized. These RSVD bits are defaulted to zeros in the IS-54B specification, which conveniently indicates when no location information has been provided. Another possibility would be to provide the DL into the Layer 2 frame of the DTC.

According to exemplary embodiments of the present invention, all channel numbers are valid candidates for digital control channel assignment. Considering that the DL does not necessarily uniquely identify any particular channel number, it is desirable that a priority scheme be established which can be used to search for digital control channel within each channel block identified by the DL. A mobile station receiving the DL value associated with a particular channel block will not automatically search all channels, but will instead search for a digital control channel in this block in accordance with this priority scheme. Thus, for example, for a DL value of 1, a mobile station could examine channel numbers 8 through 1 starting with channel 8 then 7, etc., in an attempt to find the digital control channel.

Figure 3:
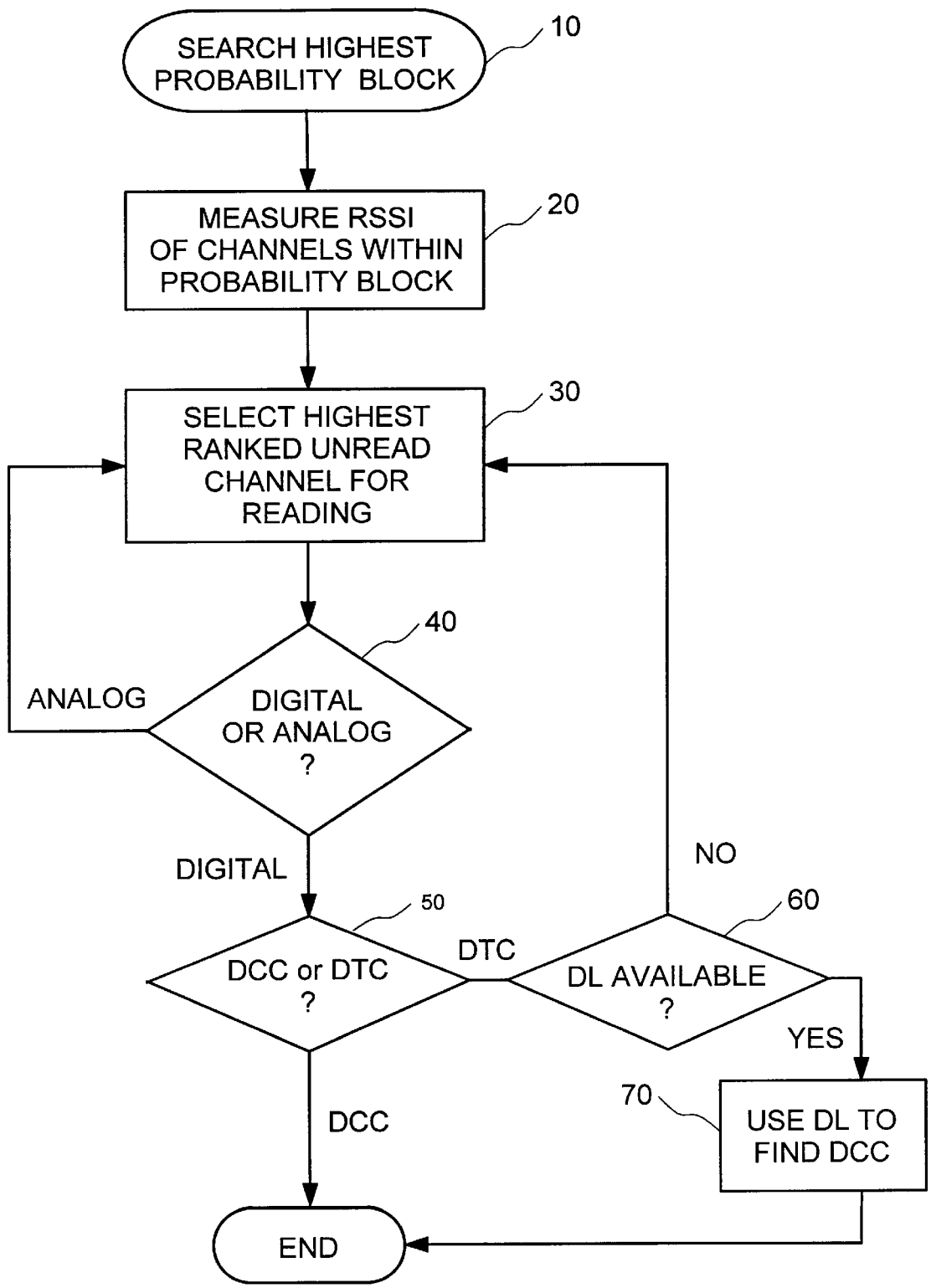
FIG. 3 is a flow chart which depicts an exemplary method for locating a digital control channel according to the present invention.

Having described exemplary techniques which can be used to expedite the location of a digital control channel, other exemplary embodiments of the present invention will now be described wherein these techniques are applied in various situations. For example, and with reference to the flow chart of FIG. 3, suppose that a mobile station is seeking a digital control channel on the A-Band carrier of an IS-54 system. As shown at block 10, the mobile will first examine, assuming that no other information is available in the mobile station, the channels within the highest ranked probability block, for example, block 1 having channel numbers 1–26 in FIG. 1(a). Within this block of channels, the mobile will select a first channel to read based on some predetermined criteria. For example, as described in block 20, this criteria can be the measured signal strength of the channels within the probability block. Alternately, the channels could be read in numbered order within the block. Thus, the mobile measures the signal strength (RSSI) of channels 1–26 and ranks them in order from strongest to weakest. The highest signal strength channel, denoted channel 'X' for this discussion, is then selected for reading at block 30. If this selected channel 'X' is identified as an analog channel at block 40, i.e., either an analog control channel or an analog traffic channel, then the flow returns to block 30 where the next highest ranked channel is selected for reading. If, on the other hand, channel 'X' is a digital channel, then the flow proceeds to decision block 50 wherein the digital channel is identified as being either a control channel or a traffic channel. This identification can be performed in a variety of ways.

As an example for distinguishing between a digital traffic channel and a digital control channel, the IS-54 standard will again be used as an illustrative reference. Although the IS-54B digital traffic channel and digital control channel downlink slot format have structural commonality, as seen in FIGS. 2(*a*) and 2(*c*), there are also certain differences which allow for distinguishing a digital control channel from a digital traffic channel. First, because of the differences in the channel coding of the digital verification color code (DVCC) and superframe (SFP) fields, there are always 4 bits out of 12 which are different in every pair of CDVCC and CSFP codewords regardless of which CDVCC or CSFP codeword is transmitted by a base station (bit errors introduced due to radio channel impairments, however, may change the extent to which transmitted codewords differ once they are received by a mobile station). More specifically, the four check bits of the SCFP are inverted relative to the check bits of the CDVCC. Secondly, the CDVCC content is fixed from slot to slot on a digital traffic channel whereas the content of the CSFP changes in a predictable fashion from slot to slot on a digital control channel.

FIG. 2(*e*) illustates an exemplary technique for distinguishing between traffic channels and control channels using the differences illustrated in FIG. 2(*a*) through 2(*c*). At step 2, a field is broadcast on a channel that includes either CDVCC or CSFP depending upon whether the channel is a digital traffic or a digital control channel, respectively. At step 4, the field is received at a mobile station. Then, the field of interest is evaluated at decision block 6 to determine whether the check bits in this field are inverted relative to those expected in a digital traffic channel. If so, then the flow proceeds to block 7 wherein the channel is characterized as a digital control channel. Otherwise, the flow proceeds to block 8 where the channel is characterized as a digital traffic channel.

Another distinction which could be used is that the channel coding and interleaving employed on a digital traffic channel is different from that employed on a digital control channel regardless of the DTC service (speech or FACCH). For example, the digital traffic channel might use ½ rate coding while the digital control channel uses ¼ rate coding. Moreover, the IS-54B SACCH and RESERVED fields have different functionality on a digital control channel. The actual function of each of the fields illustrated in FIGS. 2(*a*)–2(*d*) is not germane to the present discussion, however, for a more detailed explanation of the functionality of these fields reference is made to the above-incorporated application.

If channel 'X' is a digital control channel then the location process has accomplished its goal and the flow proceeds to the END block. If, on the other hand, channel 'X' is a digital traffic channel, then the process moves to block 60 wherein it is determined whether or not the digital traffic channel includes digital control channel location information, such as the aforedescribed DL field. If not, then the mobile reads another channel and the flow moves back to block 30. If so, then this information is used to find the digital control channel at block 70.

As an alternative to the foregoing probability block scheme, in hybrid systems where analog control channels still exist, such as the IS-54B, digital location information can be placed on these channels. For example, digital control channel information can be placed on each of the 21 dedicated analog control channels found on both carriers in IS-54B. Then, a mobile station can first tune to the strongest available analog control channel, determine where the digital control channel for that cell is located, and then tune directly to the digital control channel.

According to another exemplary embodiment of the present invention, information regarding digital control channel location can also be provided to a mobile station when that mobile station undergoes a call termination. One of the messages which is typically sent from a base station to a mobile station in connection with the termination of a call is a RELEASE message which informs the mobile search for a DCC on an indicated frequency. By placing information regarding the location of a digital control channel associated with the cell in which the mobile station is located at the time of call termination on the RELEASE message, the mobile station need not then go through any procedures for locating a new digital control channel. In this way, the mobile station will have knowledge of digital control channel location regardless of whether it has been handed off or not during a previous connection.

As an example, FIGS. 4(*a*) and 4(*b*) illustrate message formats by which information can be provided to a mobile station in the RELEASE message for finding a digital control channel. FIG. 4(*a*) shows an overview of an exemplary RELEASE message format which includes a Type 0 (optional) DCC information field having 29 bits. An exemplary format for these 29 bits is illustrated in FIG. 4(*b*). Therein, the "Parameter Type" field identifies the field as a DCC information field. The "Number of Values" field indicates how many information elements are in the message. The "Channel" field identifies the frequency on which a control channel can be found and the "DVCC field" provides digital verification color code information. Of course those skilled in the art will appreciate that the foregoing signal format is only an exemplary, illustrative manner in which digital control channel location information can be provided and that other formats can be used.

Figure 5:
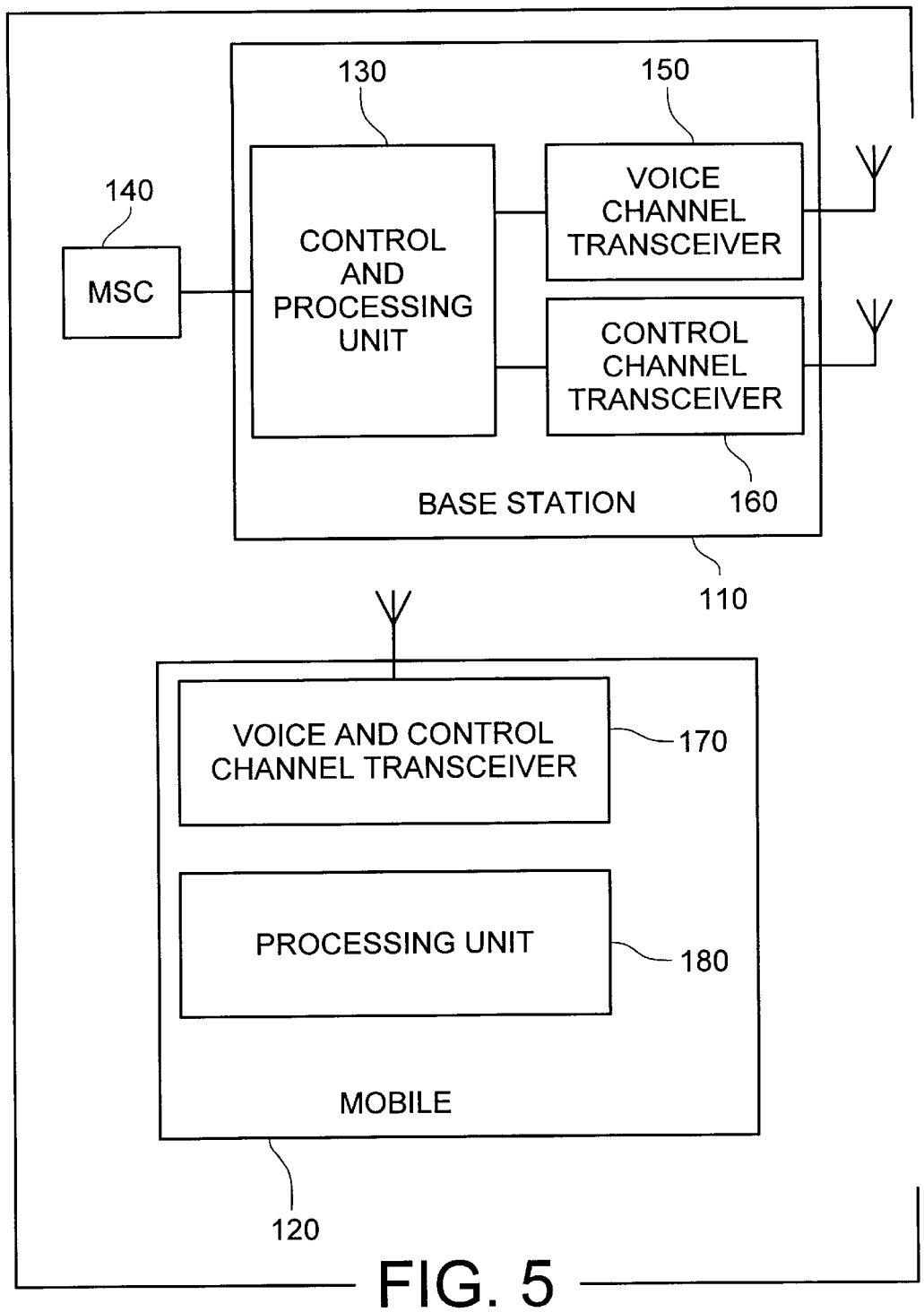
FIG. 5 is a block diagram of an exemplary radio communication system according to the present invention.

FIG. 5 represents a block diagram of an exemplary cellular mobile radiotelephone system according to one embodiment of the present invention which can be used to implement the foregoing. The system shows an exemplary base station 110 and a mobile 120. The base station includes a control and processing unit 130 which is connected to the MSC 140 which in turn is connected to the public switched telephone network (not shown).

The base station 110 for a cell includes a plurality of voice channels handled by voice channel transceiver 150 which is controlled by the control and processing unit 130. Also, each base station includes a control channel transceiver 160 which may be capable of handling more than one control channel. The control channel transceiver 160 is controlled by the control and processing unit 130. The control channel transceiver 160 broadcasts control information over the control channel of the base station or cell to mobiles locked to that control channel. The voice channel transceiver handles the traffic or voice channels which can include digital control channel location information as described previously.

When the mobile 120 first enters the idle mode, it periodically scans the control channels of base stations like base station 110 to determine which cell to lock on or camp to. The mobile 120 receives the absolute and relative information broadcasted on a control channel at its voice and control channel transceiver 170. Then, the processing unit 180 evaluates the received control channel information which includes the characteristics of the candidate cells and determines which cell the mobile should lock to. The received control channel information not only includes absolute information concerning the cell with which it is associated, but also contains relative information concerning other cells proximate to the cell with which the control channel is associated. These adjacent cells are periodically scanned while monitoring the primary control channel to determine if there is a more suitable candidate. Additional information relating to specifics of mobile and base station implementations can be found in copending U.S. patent application Ser. No. 07/967,027 entitled "Multi-Mode Signal Processing" filed on Oct. 27, 1992 to P. Dent and B. Ekelund, which disclosure is incorporated here by reference.

The above-described exemplary embodiments are intended to be illustrative in all respects, rather than restrictive, of the present invention. Although the foregoing exemplary embodiments have been described in terms of base and mobile stations, the present invention can be applied to any radiocommunication system. For example, satellites could transmit and receive data in communication with remote devices, including portable units, PCS devices, personal digital assistants, etc.

Thus the present invention is capable of many variations in detailed implementation that can be derived from the description contained herein by a person skilled in the art. All such variations and modifications are considered to be within the scope and spirit of the present invention as defined by the following claims.

What is claimed is:

1. A method for locating a control channel among a plurality of traffic channels and control channels comprising the steps of:

grouping said plurality of traffic and control channels into a plurality of blocks;

ranking each of said blocks based upon a relative likelihood of finding said control channel therein; and investigating channels within a highest ranked block to locate said control channel.

2. A radiocommunication system comprising:

a plurality of base stations which communicate with mobile stations using a plurality of channels including both control channels and traffic channels, said channels grouped into a plurality of blocks which are ranked based upon a relative likelihood of finding a control channel in each block; and means, in said mobile stations, for investigating channels to locate said control channels in said blocks based upon said ranking.

3. A method for locating a digital control channel among a plurality of channels comprising the steps of:

grouping said plurality of channels into a plurality of blocks;

ranking each of said blocks based upon a relative likelihood of finding said control channel therein;

reading channels within a highest ranked block to locate a digital channel;

obtaining, if said digital channel is a digital traffic channel, location information pointing toward a digital control channel; and using said location information to locate said digital control channel.

4. A method for distinguishing between a digital traffic channel and a digital control channel comprising the steps of:

identifying a field in a timeslot of a channel which is either a coded digital verification color code (CDVCC) field or a coded superframe phase (CSFP) field, depending upon whether said channel is a digital traffic channel or a digital control channel, respectively;

determining whether said field has check bits which are inverted relative to check bits of a digital traffic channel;

characterizing said channel as a digital control channel if said check bits are inverted, otherwise characterizing said channel as a digital traffic channel.

5. A method of broadcasting digital traffic channels and digital control channels comprising the steps of:

broadcasting, from a base station, digital traffic channels including coded digital verification color code (CDVCC) fields and digital control channels including coded superframe chase (CSFP) fields;

including, in said CDVCC fields, first check bits;

providing, in said CSFP fields, second check bits; and wherein said first and second check bits are inverted relative to one another.

6. A method for distinguishing between a digital traffic channel and a digital control channel in a mobile station comprising the steps of:

receiving and decoding a field in a channel which has been broadcast over an air interface , said field having a primary purpose which is different than distinguishing between a digital traffic channel and a digital control channel;

determining if error correction bits in said field are inverted relative to a predetermined set of error correction bits; and identifying said channel as a digital traffic channel or as a digital control channel based upon said step of determining.

7. A base station comprising:

a transmitter for broadcasting digital traffic channels and digital control channels;

a processor for including coded digital verification color code (CDVCC) fields in said digital traffic channels and coded superframe phase (CSFP) fields in said digital control channels;

said processor also including, in said CDVCC fields, first check bits;

said processor also providing, in said CSFP fields, second check bits; and wherein said first and second check bits are inverted relative to one another.

8. A mobile station comprising:

means for receiving and decoding a field, said field having a primary purpose which is different than distinguishing between a digital traffic channel and a digital control channel in a channel which has been broadcast over an air interface;

a processor for determining if error correction bits in said field are inverted relative to a predetermined set of error correction bits; and wherein said processor identifies said channel as a digital traffic channel or as a digital control channel based upon said determination.

9. A base station comprising:

a transmitter for broadcasting a digital traffic channel and a digital control channel using timeslots;

a processor for including a coded digital verification color code (CDVCC) field in said digital traffic channel and a coded superframe phase (CSFP) field in said digital control channel; and wherein a value of said CDVCC fields remains fixed from timeslot to timeslot while a value of said CSFP fields varies from timeslot to timeslot.

10. A radiocommunication system comprising:

a base station which communicates with mobile stations using a plurality of channels including a control channel and traffic channels, said channels grouped into a plurality of blocks which are ranked based upon a relative likelihood of finding a control channel in each block; and means, in said mobile stations, for investigating channels to locate said control channels in said blocks based upon said ranking.

* * * * *